United States Patent [19]
Watkins et al.

[11] Patent Number: 5,438,842
[45] Date of Patent: Aug. 8, 1995

[54] METHOD AND APPARATUS FOR COOLING A TRACTOR USING AIR FROM A REFRIGERATION TRAILER

[75] Inventors: Roy E. Watkins; Randy S. Watkins; Perry A. Watkins, all of Douglass, Kans.

[73] Assignee: Economy Cooling, Incorporated, Douglass, Kans.

[21] Appl. No.: 72,121

[22] Filed: Jun. 7, 1993

[51] Int. Cl.[6] .............................................. B60H 1/32
[52] U.S. Cl. .......................................... 62/89; 62/239; 62/244; 454/91
[58] Field of Search ................... 62/244, 239, 299, 89; 454/903, 90, 91

[56] References Cited

U.S. PATENT DOCUMENTS 3,211,076 10/1965 Chancellor et al. .............. 62/244 X
5,253,700 10/1993 Early, Jr. ......................... 62/239 X Primary Examiner—William E. Wayner
Attorney, Agent, or Firm—John W. Carpenter

[57] ABSTRACT

In combination with a tractor and refrigeration trailer, a cooling system for cooling the air within the tractor with cooled air as conducted from the refrigeration trailer to reduce fuel consumption, pollutants, or the like, of the tractor. A method for conducting air from a refrigeration trailer to a tractor coupled thereto and a method for retrofitting a cooling system to a combination tractor and refrigeration trailer for cooling the air within the tractor with the cooling system.

20 Claims, 8 Drawing Sheets

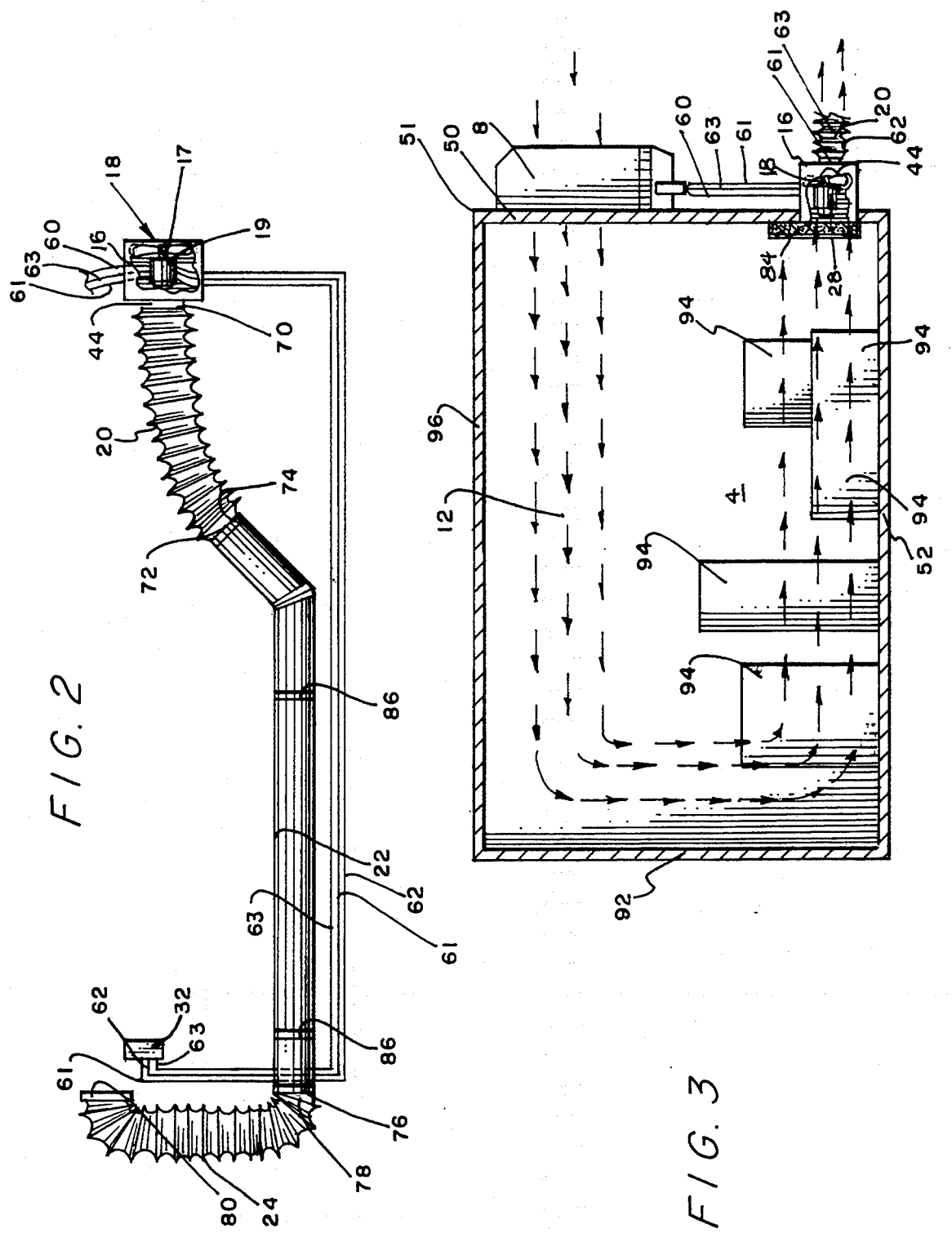

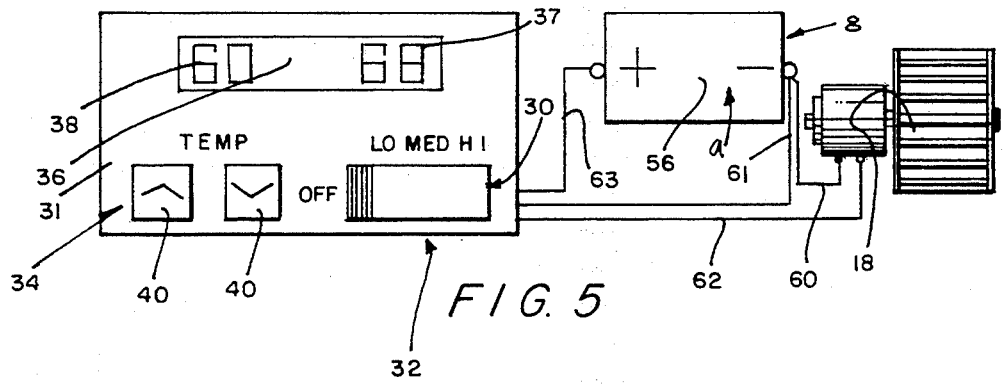
FIG. 5
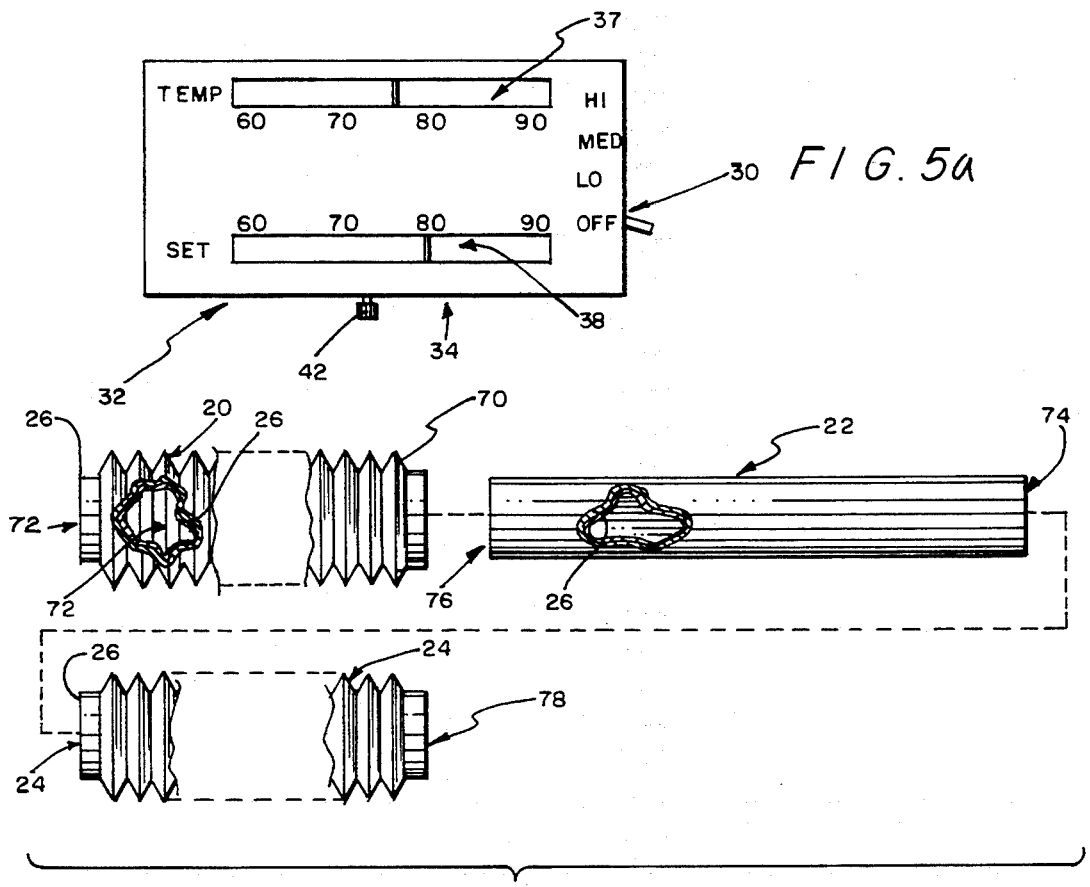
FIG. 5a
FIG. 6

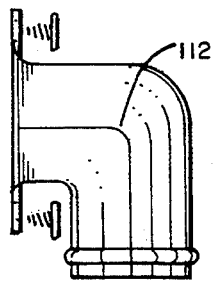
FIG. 18
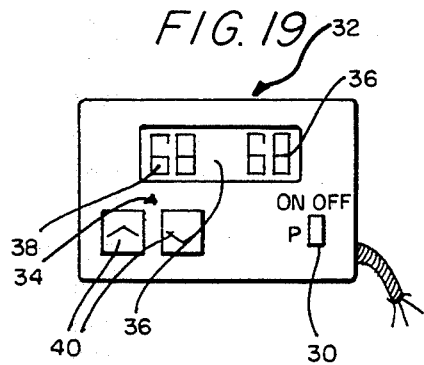
FIG. 19
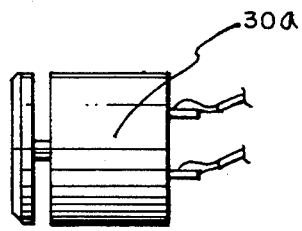
FIG. 20
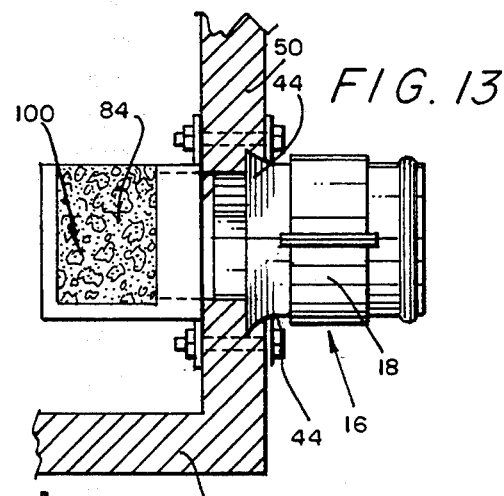
FIG. 13
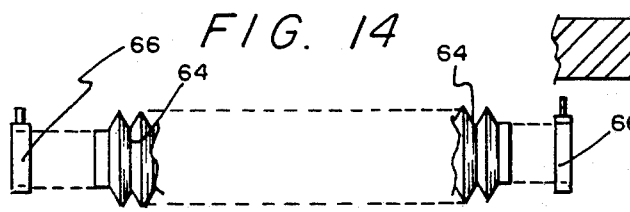
FIG. 14
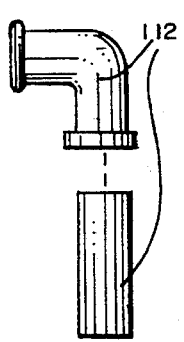
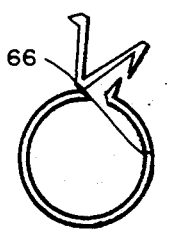
FIG. 15
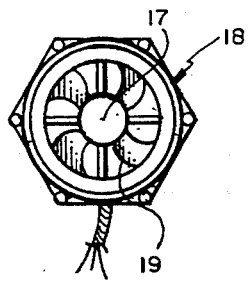
FIG. 16
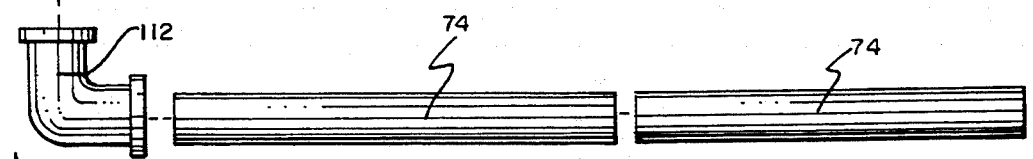
FIG. 17

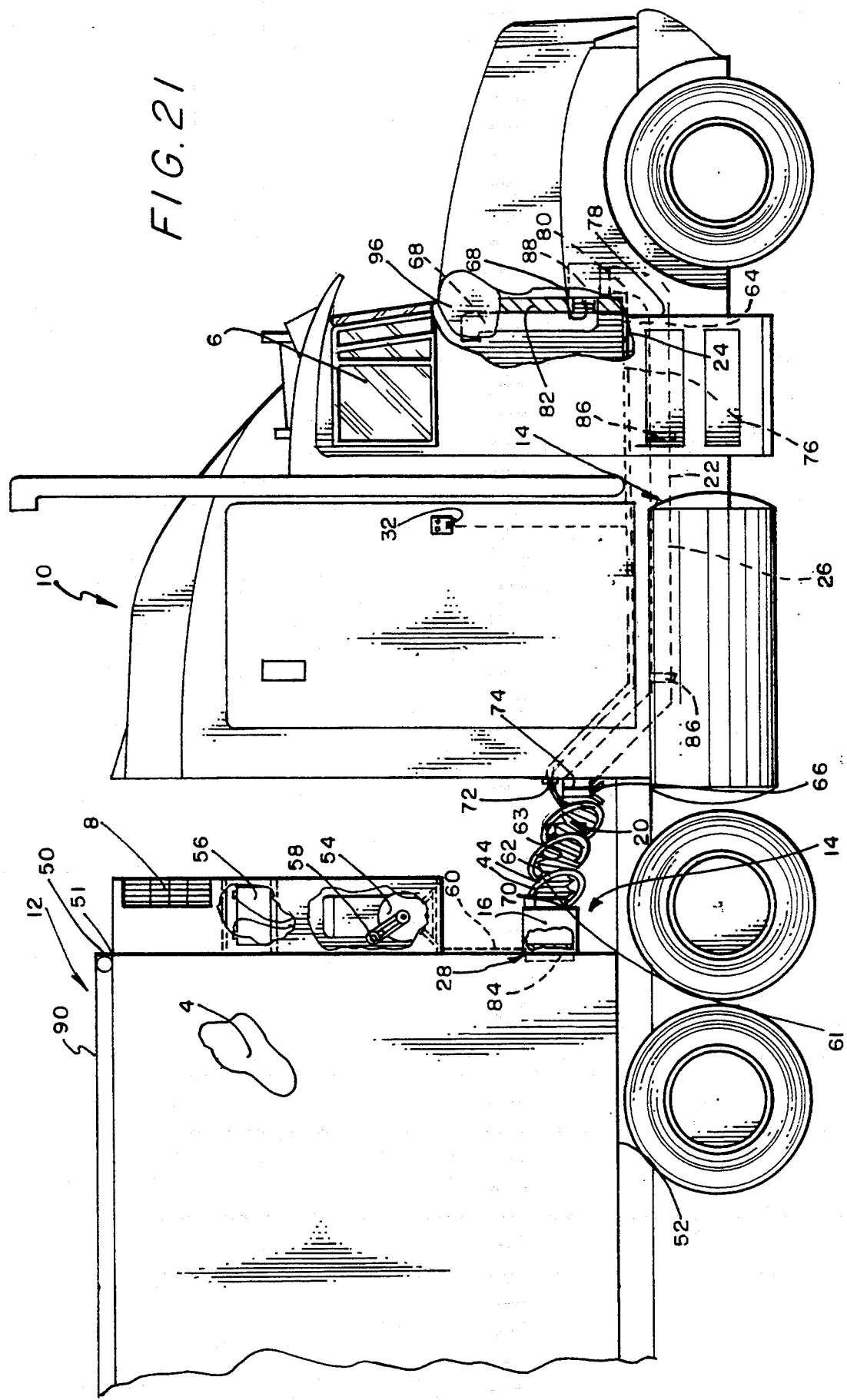

METHOD AND APPARATUS FOR COOLING A TRACTOR USING AIR FROM A REFRIGERATION TRAILER

FIELD OF THE INVENTION

The present invention generally relates to a method and/or apparatus for cooling an interior of a cab of a tractor, in the combination of a tractor coupled to a refrigeration trailer. More specifically, the present invention relates to providing a method and/or apparatus for cooling a cab and/or a sleeper in the rear of a cab of a combination of a tractor and refrigeration trailer by utilizing cooled air from the refrigeration trailer of the combination.

BACKGROUND OF THE INVENTION

Cooling devices for vehicles are well known in the art. Most cooling devices consist of a two phase heat exchange wherein a heat exchanger is cooled with a pre-cooled cooling agent and air to be cooled is passed over the heat exchanger. The cooling agent is then circulated to another heat exchanger where the cooling agent is subsequently re-cooled by exchanging heat with the atmosphere. The present invention provides a novel method and apparatus for cooling a tractor employing air from a refrigeration trailer coupled to the tractor. The present invention uses existing cooling-systems in combination with an apparatus to form a novel method for cooling a cab or interior of a tractor-trailer combination with such a cooling device without reducing fuel thereof.

A patentability search was conducted and the following U.S. Patents by numbers were found: U.S. Pat. No. 2,091,594 to Innes; and U.S. Pat. No. 3,211,076 to Chancellor.

Innes ('594) discloses an air conditioning apparatus that is towed by a car, such that the car may be cooled. Chancellor et al ('076) discloses an air cooling unit for tractors None of the foregoing teach or suggest the particular method and/or apparatus of the present invention.

SUMMARY OF THE INVENTION

The present invention accomplishes its desired objects by providing an apparatus for conducting air from a refrigeration trailer to a tractor that is coupled to the refrigeration trailer comprising a fan housing means for securing to a refrigeration trailer and for containing a fan member. A first flexible conduit means is coupled to the fan housing means for conducting cool air from the fan housing means. A generally rigid conduit means is supported by a tractor and coupled to the first flexible conduit means for conducting cool air from the first flexible conduit means and a second flexible conduit means is coupled to the generally rigid conduit means and communicates with an inside of a tractor for conducting cool air from the generally rigid conduit means into the inside of the tractor. A fan means is disposed in the fan housing means and electrically communicating with a refrigeration device secured to a refrigeration trailer such that when activated the fan means may draw cool air from the refrigeration trailer and pass same through the first flexible conduit means, through the generally rigid conduit means, through the second flexible conduit means and into an inside of a tractor. A control means is electrically engaged to the fan means and for being electrically engaged to a refrigeration device secured to a refrigeration trailer and for being disposed on an inside of a tractor and for controlling operation of the fan means to maintain a desired atmospheric condition within a tractor.

The present invention further accomplishes its desired objects by providing in combination a vehicle and an improved cooling system. The vehicle has a tractor coupled to a refrigeration trailer and the tractor has an interior portion and a firewall thereof. The trailer has an interior portion thereof and a refrigeration device secured to a front wall thereof for cooling air in the interior portion thereof. The improvement comprises:

(a) a fan housing member secured to the refrigeration trailer and for containing a fan member;

(b) a first flexible conduit member coupled to the fan housing member for conducting cool air from the fan housing member;

(c) a generally rigid conduit member supported by the tractor and coupled to the first flexible conduit member for conducting cool air from the first flexible conduit member;

(d) a second flexible conduit member coupled to the generally rigid conduit member and communicating with the interior portion of the tractor for conducting cool air from the generally rigid conduit member into the interior portion of the tractor;

(e) a fan member disposed in the fan housing means and electrically communicating with the refrigeration device secured to the refrigeration trailer such that when activated the fan member draws cool air from the refrigeration trailer and passes same through the first flexible conduit member, through the generally rigid conduit member, through the second flexible conduit member and into the interior portion of the tractor;

(f) a control means electrically engaged to the fan member and electrically engaged to the refrigeration device secured to the refrigeration trailer and disposed on the interior portion of the tractor for controlling operation of the fan member to maintain a desired atmospheric condition within the tractor.

(g) a first clamping member for clamping a first end of the first flexible conduit member to the fan housing member;

(h) a second clamping member for releasably clamping a second end of the first flexible conduit means to a first end of the generally rigid conduit member; and (i) a third clamping member for clamping a first end of the second flexible conduit member to a second end of the generally rigid conduit member.

The present further yet accomplishes its desired objects by providing a process for cooling in combination the tractor (or truck) having the first interior portion and the trailer (or an enclosed base bed) wherein the trailer comprises the refrigeration device for cooling the enclosed interior area or portion of the trailer, comprising the steps of:

(a) providing a tractor (or a truck) coupled to a trailer (or an enclosed bed) wherein the tractor comprises a firewall and a first interior portion, and the trailer comprises a front wall member having the refrigeration device secured thereto for cooling the enclosed interior portion of the trailer;

(b) providing a fan shrouding member, a fan member to be encapsulated by the fan shrouding member, at least one air conduit member, a filter member and a thermostatic control means for regulating the fan member;

(c) disposing a first aperture in the front wall of the trailer;

(d) disposing the filter member in or over the first aperture;

(e) securing the fan shrouding member to the front wall member of the trailer such that the fan shrouding member covers and communicates with the first aperture and/or filter member such that air from the enclosed interior portion of the trailer may pass into the fan shrouding member;

(f) disposing the fan member in the fan shrouding member;

(g) disposing a firewall aperture in the firewall of the tractor;

(h) coupling a first end of the least one air conduit to the fan shrouding member;

(i) passing a second end of the least one air conduit through the firewall aperture in the firewall of the tractor such that the first interior portion of the tractor is in communication with the enclosed interior portion of the trailer via the least one air conduit;

(j) disposing the thermostatic control means in the tractor for regulating the fan member;

(k) connecting a first electrical line from the refrigeration device to the thermostatic control means to supply electrical current thereto, and a second electrical line from the refrigeration device to the thermostatic control means to return electrical current therefrom, and a third electrical line from the thermostatic control means to the fan member to supply electrical current from the thermostatic control means to the fan member, and a fourth electrical line from the refrigeration device to the fan member to return electrical current therefrom;

(l) cooling the interior of the trailer with the refrigeration device;

(n) engaging the fan member with the thermostatic control means;

(m) operating and/or adjusting the thermostatic control means to regulate the fan member;

(o) conducting air from the enclosed interior portion of the trailer to the first interior portion of the tractor through the least one air conduit with the fan member; and (p) cooling the first interior portion of the tractor or truck.

It is further still an object of the present invention to provide a method for retrofitting an existing tractor and refrigeration trailer with the cooling system described above, comprising the steps of:

(a) providing a refrigeration trailer having a refrigeration device, and forming an aperture in a wall of the refrigeration trailer such that the trailer comprises an aperture disposed in a front wall of the trailer wherethrough cooled air may be passed;

(b) providing a cooling system comprising a fan housing member, a fan member, a first flexible conduit member, a generally rigid conduit member, a second flexible conduit member, a filter member, a first electrical line, a second electrical line, a third electrical line, a fourth electrical line, and a control means;

(c) disposing the fan in the fan housing member;

(d) securing the fan housing member on the front wall of the trailer such that the fan housing member is generally superimposed on and/or the aperture;

(e) disposing the filter member in the fan housing member such that air leaving the trailer passes therethrough;

(f) disposing a firewall aperture in the firewall of the tractor;

(g) securing a first end of the first flexible conduit member to the fan housing member;

(h) securing a first end of the generally rigid conduit member to a second end of the first flexible conduit member;

(i) securing a first end of the second flexible conduit member to a second end of the generally rigid conduit;

(j) passing a second end of the second flexible conduit member through the firewall aperture;

(k) disposing the control means in an interior of the tractor;

(l) connecting a first electrical line between the refrigeration unit secured to the trailer and the control means;

(m) connecting a second electrical line between the refrigeration unit secured to the trailer and the control means;

(n) connecting a third electrical line between the refrigeration unit secured to the trailer and the fan member; and (o) connecting a fourth electrical line between the control means and the fan member to retrofit the cooling system to the tractor and the trailer.

It is yet another object of the invention to provide a process for cooling a tractor coupled to a refrigeration trailer having a refrigeration device for cooling air contained in the refrigeration trailer. The process comprises the steps of:

(b) providing a cooling system comprising a fan housing member, a fan member, a first flexible conduit member, a generally rigid conduit member, a second flexible conduit member, a filter member, a first electrical line, a second electrical line, a third electrical line, a fourth electrical line, and a control means;

(c) disposing the fan in the fan housing member;

(d) securing the fan housing member on the front wall of the trailer such that the fan housing member in generally superimposed on the aperture;

(e) disposing the filter member in the fan housing member such that air leaving the trailer passes therethrough;

(f) disposing a firewall aperture in the firewall of the tractor;

(g) securing a first end of the first flexible conduit member to the fan housing member;

(h) securing a first end the generally rigid conduit member to a second end of the first flexible conduit member;

(i) securing a first end of the second flexible conduit member to a second end of the generally rigid conduit;

(j) passing a second end of the second flexible conduit member through the firewall aperture;

(k) disposing the control means in an interior of the tractor;

(l) connecting a first electrical line between the refrigeration unit secured to the trailer and the control means;

(m) connecting a second electrical line between the refrigeration unit secured to the trailer and the control means;

(n) connecting a third electrical line between the refrigeration unit secured to the trailer and the fan member; and (o) connecting a fourth electrical line between the control means and the fan member (p) operating the refrigeration device of the refrigeration trailer to cool the air contained therein;

(q) activating the fan member with the control means;

(r) conducting air from the trailer through the filter member into the fan housing member;

(s) conducting air from the fan housing member through the generally flexible air conduit;

(t) conducting air from the generally flexible air conduit into an interior of the tractor for cooling the tractor.

It is still another object of the present invention to provide a process for cooling an interior of a tractor and a refrigeration trailer in combination. The combination comprises a cooling system for cooling the trailer with air conducted from a refrigeration tractor comprising the steps of:

(a) providing the tractor having a firewall and a firewall aperture disposed in the firewall, and a trailer having a refrigeration device and an aperture disposed in a front wall of the trailer;

(b) providing the cooling system having a filter member, a fan housing member, a fan member, a first flexible conduit member, a generally rigid conduit member, a second flexible conduit member, at least four electrical lines, and a control means for regulating the fan member;

(c) pushing cooled air from the refrigeration device;

(d) circulating cooled air from the refrigeration device along a top of the trailer to a rear wall;

(e) circulating cooled air downward along the rear wall;

(f) drawing air along a bottom of the trailer with the refrigeration device; and (g) operating the cooling system to draw a portion of the air though the aperture of the trailer.

It is therefore an object of the invention to provide an apparatus and process/method for providing and/or a cooling system by cooling the interior of a tractor cab with cooled air conducted from a refrigeration trailer.

These, together with the various ancillary objects and features which will become apparent to those skilled in the art as the following description proceeds, are attained by this novel method for and apparatus, a preferred embodiment as shown with reference to the accompanying drawings, by way of example only, wherein;

BRIEF DESCRIPTION OF THE DRAWINGS

FIG. 2 is a side elevational view of the cooling system components of FIG. 1 segmented from the tractor and the refrigeration trailer;

FIG. 3 is a vertical cross-section of a refrigeration trailer having a fan shrouding, a fan, and the path of air flow from a refrigeration device within the refrigeration trailer to the device of the present invention being depicted by arrows;

FIG. 5 is a schematic diagram of the fan and a thermostatic control means used in the system of the present invention;

FIG. 5a is a top plan view of an alternate embodiment of the thermostatic control means depicted in FIG. 5;

FIG. 6 is a perspective view of a plurality of air conduits having insulation disposed therearound;

FIG. 10 is a front elevational view of the embodiment of the fan depicted in FIG. 7a;

FIG. 13 is a side elevational view of an alternative embodiment of the fan and the fan shrouding member of the invention;

FIG. 14 is a side elevational view of an alternative embodiment of the flexible air conduit and the quick connect clamp;

FIG. 15 is a side elevational view of an alternative embodiment of the quick connect clamp;

FIG. 16 is side elevational view of the alternative embodiment of the fan shown in FIG. 7a;

FIG. 17 is a segmented view of a portion of the cooling system components as shown in FIG. 1;

FIG. 18 is a side elevational view of one of the cooling system components;

FIG. 19 is a front elevational view of a portion of another embodiment of the thermostatic control means;

FIG. 20 is a side elevational view of another portion the embodiment of the thermostatic control means; and FIG. 21 is a side elevational view of the tractor, trailer, the refrigeration device, and the cooling system of the invention, wherein the tractor has a firewall and a ventilation system secured to a dashboard.

DETAILED DESCRIPTION OF THE INVENTION

Figure 1:
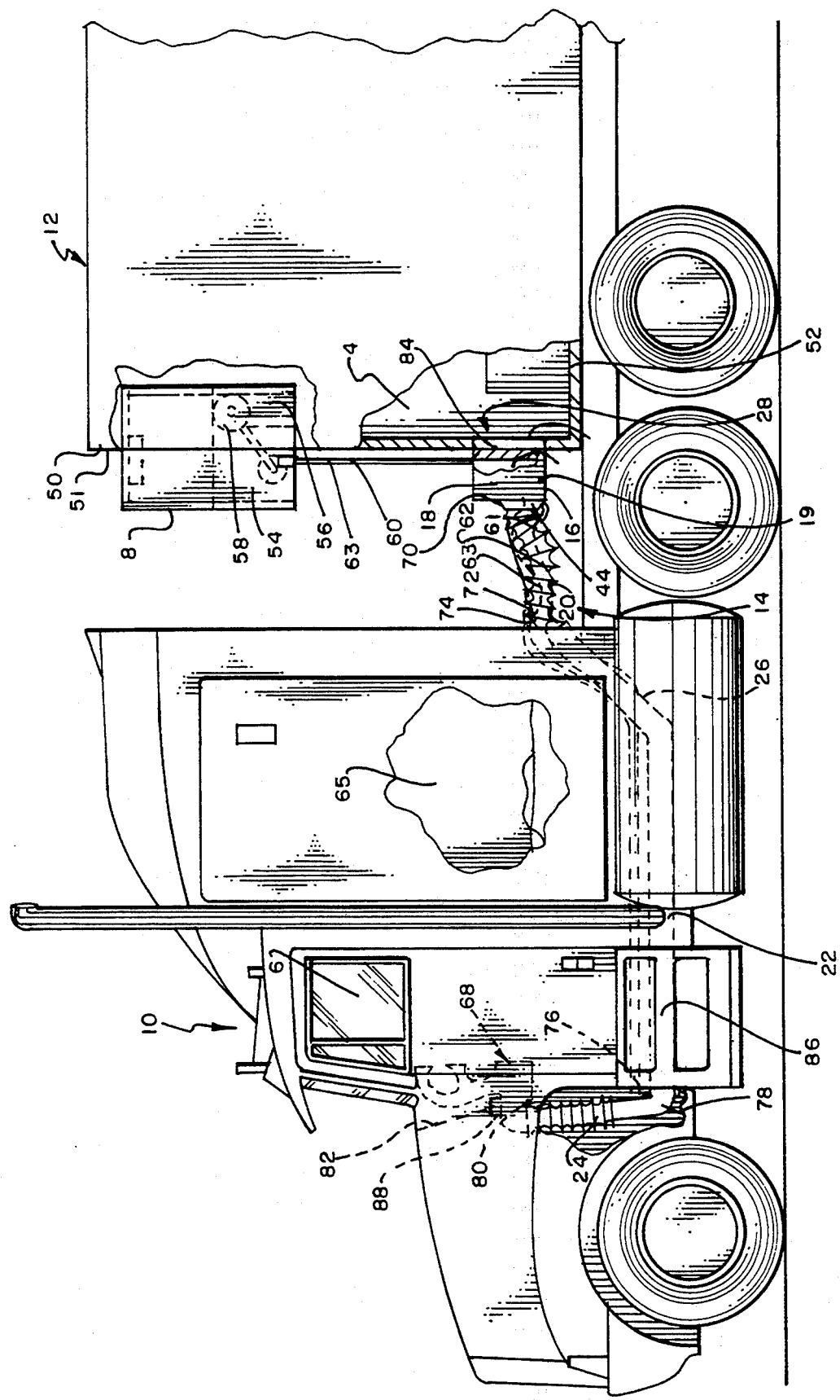
FIG. 1 is a side elevational view of a semi-tractor coupled to a refrigeration trailer having a refrigeration unit and disclosing the cooling system components of the invention.

Turning now to the drawings wherein similar parts of the invention are identified with like reference numerals, there is seen in FIG. 1 a tractor 10 and a refrigeration trailer 12 coupled thereto to provide a combination. The tractor 10 maybe any suitable tractor or "semi" of the type used in the transportation of products on a highway. The refrigeration trailer 12 (e.g. a "refer") is preferably of the type used in transporting such perishable items as pharmaceuticals, dairy products, meat products, and the like. A refer trailer 12 as such generally comprises a refrigeration device 8 for cooling and circulating air within the trailer 12. Refrigeration devices such as refrigeration device 8 are well known in the art for refrigerators, air conditioners, etc, and generally comprise a cooling apparatus and a power source. It is not an intent of the present invention to redefine the cooling apparatus used in a refrigeration device per se, rather it is an intent of the present invention to provide for a novel use of the refrigeration device 8 in combination with the trailer 12 in the method of the present invention, all of which will become more apparent as this description proceeds. As further seen in FIG. 1, the cooling assembly or system of the present invention, generally illustrated as 14, is retro-fitted to the combination tractor/trailer 10-12. FIG. 2 discloses the cooling system or assembly 14 as removed from the combination tractor/trailer 10-12. Thus, as best shown in FIG. 2, the cooling system or assembly 14 of the present invention comprises a fan shrouding member 16 secured a first flexible air conduit 20, a rigid air conduit 22 secured to the first flexible air conduit 20, and a second flexible air conduit 24 secured to the rigid air conduit 22. Additionally, as shown in FIG. 5, the cooling system or assembly 14 comprises a fan member 18 electrically coupled to a thermostatic control means 32 (see FIGS. 5 and 5a).

The power source for the refrigeration device 8 (see FIG. 1) may be any one of the types typically used in such devices, usually a relatively small diesel engine. The refrigeration device 8 is an entirely self-contained unit. Stated alternatively, the refrigeration device 8 operates independently of the tractor 10. Thus, the tractor 10 supplies no power or electricity to the refrigeration device 8. Preferably, the fan member 18 and/or the thermostatic control means 32 (see FIG. 5) of the cooling system or assembly 14 (see FIG. 1) are powered by a generator 58 and/or a battery 56 contained in the refrigeration unit 8 (see FIG. 2). It may be appreciated that the fan member 18 and/or the thermostatic control means 32 may be powered by an electrical power source generated by the tractor 10 (see FIG. 1) without departing from the scope and/or spirit of the invention. Preferably, the fan member 18 and/or thermostatic control means 32 receive electrical current from the refrigeration device 8, so that it may be operated independently of the tractor 10. It is generally preferable to operate such a cooling system or assembly independently from the tractor 10 for several reasons. First, any air conditioning system fitted to the tractor 10 and powered by the motor of the tractor 10 (or an engine disposed in the tractor 10) generally reduces fuel economy by about 30%, thereby reducing the trip capacity of the tractor 10 before having to replenish the fuel supply. Additionally, any air conditioning system fitted to the tractor reduces the amount of horsepower available to the trans-axle or drivetrain, and causes the engine to work harder, thereby shortening the life of the engine. Further, the amount of emissions per mile traveled from the exhaust of the tractor is increased when the air condition system fitted to the tractor 10 is operated; due to the fact that the engine works harder, it consumes more fuel and thus produces more exhaust. Further yet, federal law mandates that a tractor 10 be shut down generally for one-third of any 24 hour period, due to emission control standards. An operator of a tractor 10 may use this time to repose or otherwise rest in an interior portion 6 of the tractor 10. With a typical air conditioning system fitted to the tractor, the air conditioning system is not operable while the engine of the tractor is shut down, causing the operator to be uncomfortable during warmer days of the year. Finally, the fuel used to power an engine 54 of the refrigeration device 8 (continuing to refer to FIG. 1) is subject to alternate taxation laws than the fuel used to power the engine or motor of the tractor 10. It is thus preferable, as previously mentioned, to circulate the cool air from an interior portion 4 of the refer trailer 12 with the fan member 18 being electrically powered by the battery 56 and/or generator 58 of the engine 54 of the refrigeration device 8.

Thus, as previously mentioned, fan member 18 and/or thermostatic control means 32 are powered by the battery 56 and/or the generator 58 of the refrigeration device 8 secured to the refer trailer 12. As best shown in FIG. 5, the fan member 18 is coupled to the electrical power supply (e.g. battery 56) provided by the refrigeration device 8 (i.e. generator 58, or battery 56 which is regenerated by generator 58) by an electrical line 60. Another electrical line 62 couples the thermostatic control means 32 to the fan member 18. Additionally, the thermostatic control means 32 has a pair of electrical lines 61–63 coupling the thermostatic control means 32 to the refrigeration device 8. The thermostatic control means 32, as shown in FIG. 5, receives power from the power supply of the refrigeration device 8 via conductors/lines 61 and 63, and supplies voltage/current via conductor 62 to the fan member 18, thereby allowing control of the fan member 18. Stated alternatively, when the atmosphere surrounding the thermostatic control means 32 reaches a certain elevated temperature, the thermostatic control means 32 closes the circuit from the power supply (e.g. battery 56) to the fan 18, causing the latter to be activated. To this end, the thermostatic control means 32 comprises a fan control member 30 disposed on a face 31 of the thermostatic control means 32. The thermostatic control means 32 additionally comprises a temperature setting means 34 disposed on the face 31 of the thermostatic control means 8. The temperature setting means 34 is generally referenced to in degrees, most preferably it is referenced to by degrees Fahrenheit. For the embodiment shown in FIG. 5, the thermostatic control means 32 is electronic, comprising a digital display member 36 for displaying the ambient temperature 37 of the interior portion 6 of the tractor 10 and for displaying a desired temperature setting 38 (i.e. the desired temperature within the tractor 10) at which the thermostatic control means 32 electrically activates the fan member 18 (to circulate air from the refer trailer 12 to the interior portion 6 of the tractor 10). The temperature setting means 34, for the embodiment pictured in FIG. 5, comprises a pair of buttons 40—40 which electronically raise or lower the temperature setting 38 displayed by the digital display member 36. It should be noted that it is the intention of the invention to comprise any thermostatic control device that effectively activates the fan member 18 when the ambient temperature of the interior portion 6 of the tractor 10 rises above the temperature setting, such as the temperature setting 38 of the thermostatic control means 32 in FIG. 5. Therefore, it may be appreciated that the thermostatic control means 32 may comprises a thermoelectromechanical device, such as the thermostatic control means 32 depicted in FIG. 5a, wherein the temperature setting means 32 comprises a lever member 42 pivotally secured to the thermostatic control means 32 adjustably selecting a temperature. While an electronic thermostatic control means and a thermoelectromechanical thermostatic control means are functionally similar, an electronic thermostatic control member 32 is generally preferable in the cooling system or assembly 14 of the present invention as it is less subject to the rigors of movement and/or vibration that occurs in a moving vehicle than the thermoelectromechanical thermostatic control means 32. It is not an intent of the invention to redefine thermostatic controllers as they are well documented in the art and are readily available on the commercial market. The placement of the thermostatic control means 32 affects the operation of the cooling system or assembly 14 (see FIG. 1), as the thermostatic control means 32 regulates the fan member 18 according to the temperature of the air in the general vicinity of the thermostatic control means 32. It is preferable then to place the thermostatic controller in a location, generally in the interior portion 6 of the tractor, where it is most useful to the operator of the tractor 10. Example of such a locations are in the cab or interior portion 6 of the tractor 10 or in a sleeping quarter 65 of the tractor 10 ("sleeper").

Figure 7:
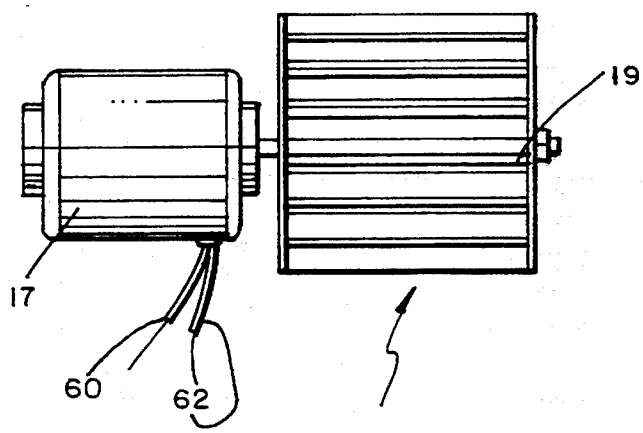
FIG. 7 is a perspective view of the fan used in the cooling system with the arrows indicating the direction of air travel induced by said fan.
Figure 7A:
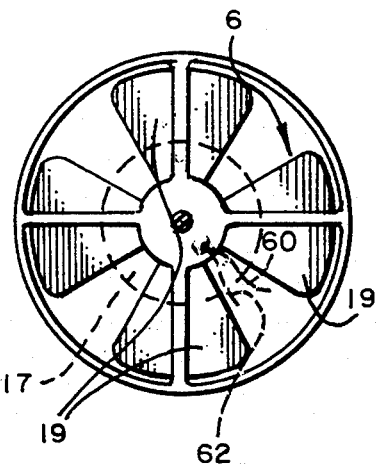
FIG. 7a is a frontal elevational view of an alternate embodiment of the fan used in the cooling system with the arrows indicating the direction of air travel induced by said fan.
Figure 7B:
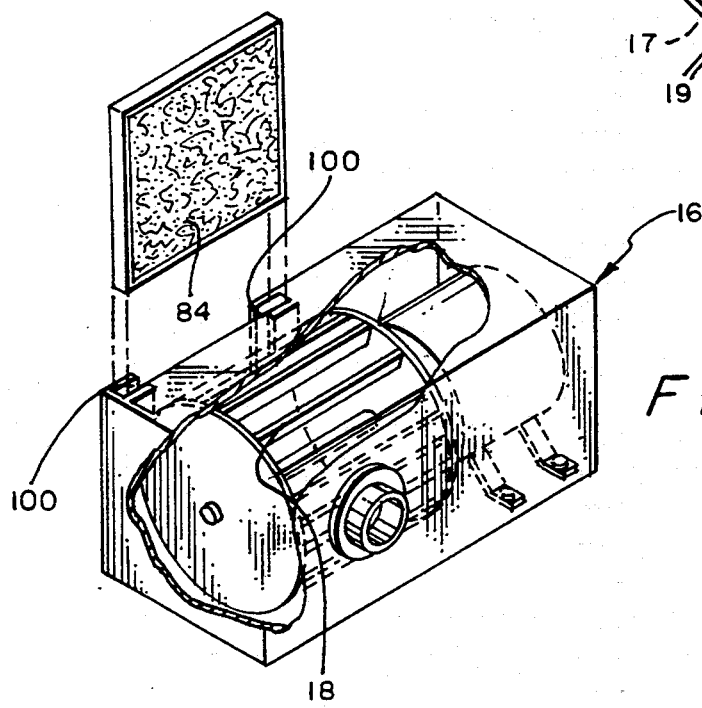
FIG. 7b is a perspective view of an embodiment of the fan shrouding member of the invention having a top member removed therefrom to disclose the detail therein preferably for use with the fan member of FIG. 7.

The fan member 18, as previously mentioned, is disposed in a fan shrouding member 16 secured to an outer edge 51 of the front wall 50 of trailer 12. The fan member 18 may comprise any fan suited to the purpose of circulating air. As shown in FIGS. 7 and 7a, fan member 18 comprises a motor member 17 and a blade member 19 coupled to the motor member 17. The blade member 19 may be any blade suited to the task of moving air from the interior portion 4 of the trailer 12 (see FIG. 1) through air conduits 20-22-24 to the interior portion 6 of the tractor 10, such as the blade member 19 depicted in FIG. 7. FIG. 7 discloses a squirrel-cage type fan blade. Such a blade is preferable as air may be conveyed in the direction of arrow a, such that the motor member 17 is generally not in the path of travel of the air. An alternate embodiment of the blade member 19 is shown in FIG. 7a wherein the direction of air travel, given by arrow b, is such that the air generally passes over the motor member 17, thereby heating the air conveyed somewhat, since the motor member 17 generates heat.

Figure 7C:
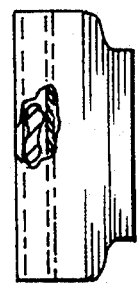
FIG. 7c is a side elevational view of one embodiment of the fan shrouding member of the invention.
Figure 8:
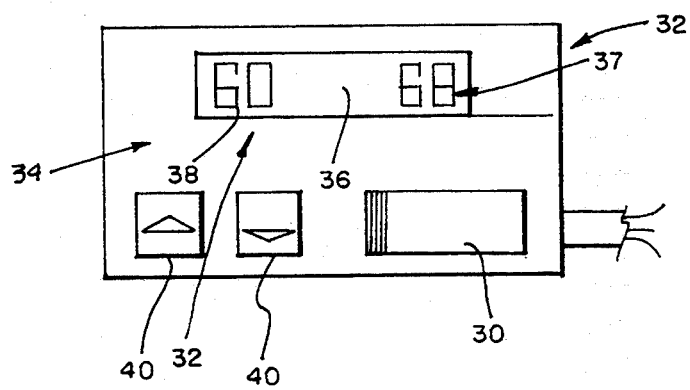
FIG. 8 is a front elevational view of the thermostatic control means
Figure 9:
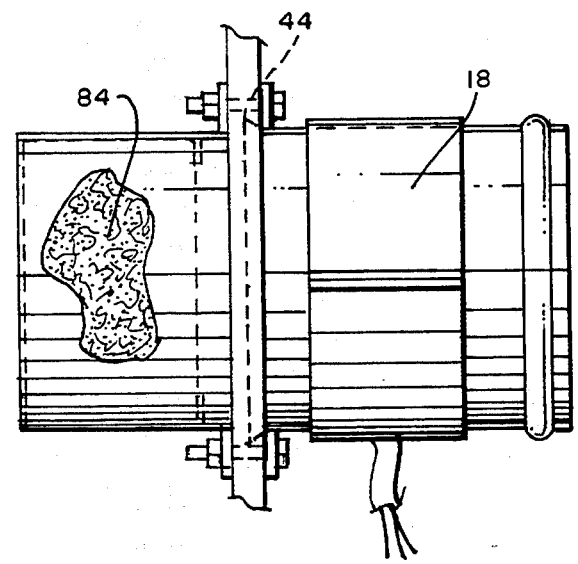
FIG. 9 is a side elevational view of a portion of an air conduit.
Figure 10:
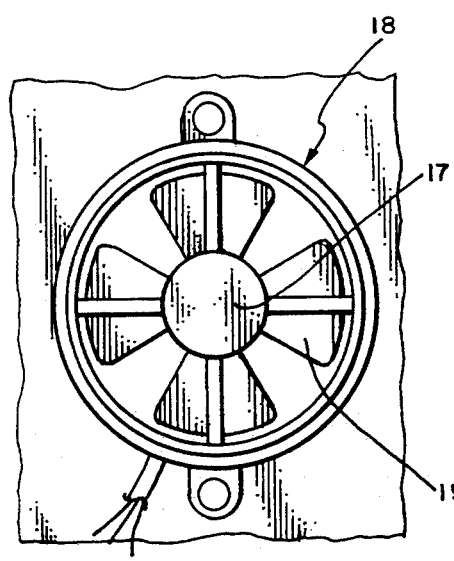
Figure 11:
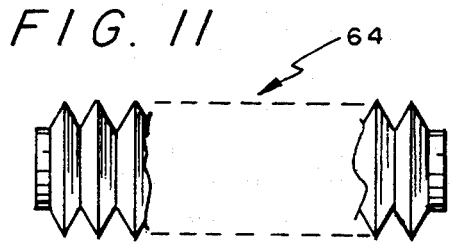
FIG. 11 is a side elevational view of a flexible portion of the air conduit.
Figure 12:
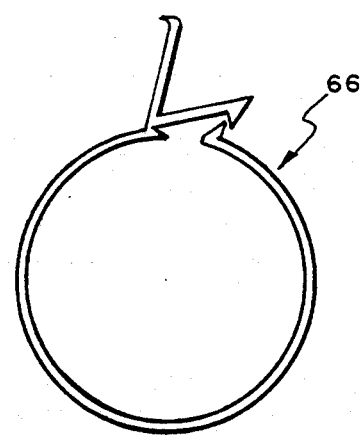
FIG. 12 is a side elevational view of a quick connect clamp.

The fan member 18 as noted above conveys air, preferably cooled air from the interior portion 4 of the refer trailer 12 to the interior portion 6 of the tractor 10. As previously mentioned, the cooling system or assembly 14 (see FIG. 1) has the first flexible air conduit 20, the second flexible air conduit 24, and the rigid air conduit 22. The first flexible air conduit 20 has a first end 70 secured to the fan shrouding member 16. The front wall member 50 of the trailer member 12 has an aperture 28 disposed therein wherethrough cooled air is drawn from the interior portion 4 by fan member 18. Preferably, the aperture 28 is disposed in front wall 50 such that the aperture 28 is located in general proximity to a bottom member 52, preferably from 0 feet to about 5 feet from bottom member 52. More preferably, the aperture 28 is disposed in front wall member 50 such that it is less than three feet from bottom member 52. To conduct the air smoothly and to protect the fan member 18, the fan shrouding member 16 is secured thereto such that the fan member 18 is disposed therein. A filter member 84 (e.g. a charcoal filter) may be disposed in the aperture 28 such that the air drawn therethrough passes through the filter member 84. In an alternate embodiment of the fan shrouding member 16, as shown in FIG. 7c, the filter member 84 may be disposed in a pair of opposed filter channels 100—100. Stated alternatively, the fan shrouding member 16 may comprise a structure defining the filter channels 100—100 wherethrough the filter member 84 may be slidably disposed. The filter member 84 may therefor be disposed in the aperture 28 or, as desired, in the filter channels 100—100 of the fan shrouding member 16. The filter member 84 may be any suitable filter for filtering air such as a charcoal filter, or a more conventional filter, both of which are available on the commercial market. The air is conveyed by the fan member 18 through the first flexible air conduit 20 to the rigid air conduit 22. The rigid air conduit 22 comprises a first end 74 secured to a second end 72 of the first flexible air conduit 20. A clamp member 66 releasably secures the first end 74 of the rigid air conduit to the second end 76 of the first flexible air conduit 20. At least one strap member 86 (see FIG. 1) secures the rigid air 22 conduit to the tractor 10. Generally, two strap members 86—86 secure the rigid air conduit 22 to the tractor 10, as shown in FIG. 1. A second end 76 of the rigid air conduit 22 is secured to a first end 78 of the second flexible air conduit 24 by another clamp member 66. A firewall aperture 88 is disposed in a firewall 82 of the tractor such that a second end 80 of the second flexible air conduit 24 passes therethrough. Preferably, the second end 80 of the second air conduit 24 passes through aperture 82 such that no air may escape thereby. Stated alternatively, the second air conduit 24 is tightly disposed in aperture 82 so that cool air is not lost from the interior portion 6 of the tractor 10 through aperture 82. Each of the air conduits 20-22-24 may define a structure comprising a layer of insulation 26 disposed around the air conduits 20-22-24, as shown in FIG. 6, such that the respective air conduits are enclosed or encapsulated in the layer of insulation 26 (which may be any suitable insulation means for preventing heat to pass therethrough). It is generally preferable to insulate the air conduits 20-22-24 with insulation 26 so that the air conduits 20-22-24 do not radiate or conduct much heat to the air being conducted therethrough. The second end 80 of the second flexible air conduit 24, as mentioned previously, passes through the firewall aperture 88 disposed in the firewall 82 of the tractor 10 and into the interior portion 6 of the tractor 10. It can be appreciated that the second end 80 of the second flexible conduit 24 may be coupled to a ventilation system 68 of the tractor 10 to more evenly distribute the cooled air from the trailer 12.

Continuing to refer to the drawings for the process and operation of the invention, more specifically with reference to FIG. 1, the tractor 10 comprising the interior portion 6 is provided in combination with the refer trailer 12 having the refrigeration device 8. Aperture 28 is disposed in the front wall 50 of the trailer 12 and filter 84 is disposed therein. The fan shrouding member 16 is secured to the outside face 51 of front wall 50 of the trailer 12 and fan member 18 is disposed therein. The first end 70 of the first flexible air conduit 20 is secured to a flange 44 of the fan shrouding member 16. The second end 76 of the first flexible air conduit 20 is secured to the first end 74 of the rigid air conduit 22. The rigid air conduit is secured to the tractor 10 with strap members 86—86. The first end 78 of the second flexible air conduit 24 is secured to the second end 76 of the rigid air conduit 22, After disposing aperture 88 in the firewall 82 of the tractor 10, the second end 80 of the second flexible air conduit 24 is passed therethrough, such that second end 80 of the second flexible air conduit 24 resides in the interior portion 6 of the tractor 10. The second end 80 of the second flexible air conduit 24 optionally may be coupled to the ventilation system 68 of the tractor 10. The thermostatic control means 32 is disposed in the interior portion 6 of the tractor 10. The thermostatic control means 32 has electrical lines 61-63 extending therefrom to the refer unit 8 secured to the trailer 12. Additionally, the thermostatic control means 32 has electrical line 62 extending therefrom to the fan member 18. Electrical line 60 is connected between the fan member 18 and refer unit 8.

Figure 4:
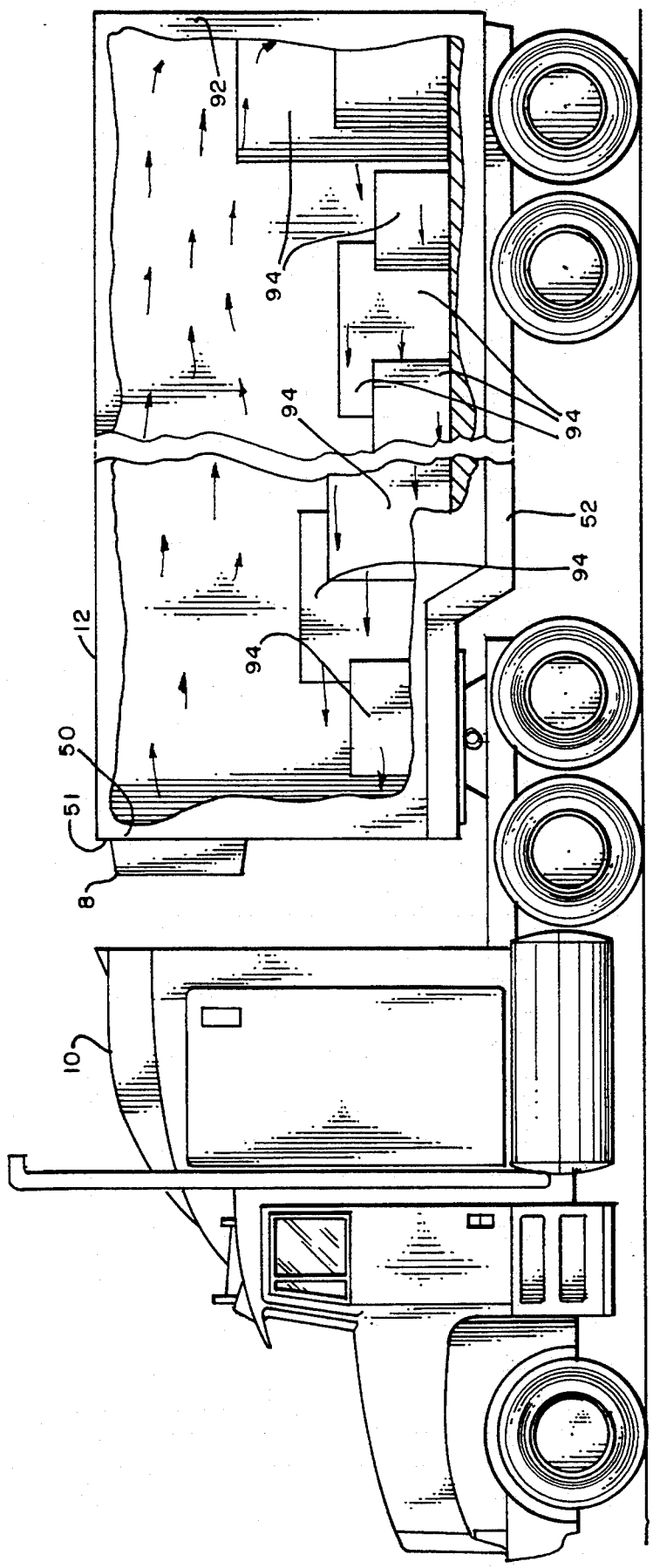
FIG. 4 is a schematic diagram of the tractor and the refrigeration trailer further depicting air flow from the refrigeration device in the trailer.

When the refrigeration unit 8 is started to produce cold air and cool the air of the interior portion 4 of the trailer 12, cooled air is circulated throughout the interior portion 4 of the trailer 12 in the direction of the arrows in FIGS. 3 and 4. The cooled air is circulated such that air leaves the refer unit 8 and travels along a top 90 of the trailer 12 to a back 92 where the air flow is directed downward. The air is then pulled forward, this time along the bottom 52 of the trailer 12, such that the air flow travels over or around boxes 94, meat products, pharmaceuticals, or the like, contained therein, by the suction of the refer unit 8 and/or by suction of the fan member 18. Using thermostatic control means 32, fan member 18 is actuated so as to pull a portion of the air flow through aperture 28 and through filter member 84 into the fan shrouding member 16 and conduct and/or move the portion of air flow through the first flexible air conduit 20, through the rigid air conduit 22 (see FIG. 1), and the second flexible air conduit 24 into the interior portion 6 of the tractor 10. The conduction of air from the interior portion 4 of the trailer 12 to the interior portion 6 of the tractor 10 is regulated by operating the temperature setting means 34 of the thermostatic control means 32. The thermostatic control means 32 supplies voltage to electrical line 62 until the temperature of the interior portion 6 of the tractor 10 falls to the temperature setting 38, which is set by the temperature setting means 36 of the thermostatic control means 32. (see FIG. 5) For the embodiment shown in FIG. 5, the temperature setting means 36 is electronic; and buttons 40—40 are operated to raise or lower the temperature setting 38 shown in display 32 until display 32 reads the desired temperature setting 38. For the embodiment shown in FIG. 5a, the temperature setting means 36 is thermomechanical, lever 42 is positioned at the desired temperature setting 38. When the temperature setting of the interior portion 6 of the tractor 10 falls to the temperature set by the temperature setting means 36 of the thermostatic control means 32, the thermostatic control means 32 interrupts the voltage supplied to line 62, thereby arresting the fan member 18 (e.g. fan member 18 is shut off), and thereby stopping the conduction of air by the fan member 18. The speed at which air is conducted to the interior portion 6 of the tractor 10 may also be regulated by the fan control member 30. For the embodiments shown in FIGS. 5 and 5a, the fan control member 30 comprises a four-position switch. The fan control member 30 is switched on to the desired fan speed in order to commence cooling of the interior portion 6 of the tractor 10. The fan control member 30 may also be used to disengage the cooling system or assembly 14 altogether. (e.g. when the ambient temperature of the interior portion 6 of the tractor 10 (see FIG. 1) rises above the temperature setting 38 of the thermostatic control means 32 (see FIG. 5)). It is thus the cooling system or assembly conducts cooled air from the refrigeration trailer 12 to the tractor 10.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus for conducting air from a refrigeration trailer to a tractor that is coupled to the refrigeration trailer comprising:
   (a) a fan housing means for securing to a refrigeration trailer and for containing a fan member;
   (b) a first flexible conduit means coupled to the fan housing means for conducting cool air from the fan housing means;
   (c) a generally rigid conduit means supported by a tractor and coupled to the first flexible conduit means for conducting cool air from the first flexible conduit means;
   (d) a second flexible conduit means coupled to the generally rigid conduit means and communicating with an inside of a tractor for conducting cool air from the generally rigid conduit means into the inside of the tractor;
   (e) a fan means being disposed in said fan housing means and electrically communicating with a refrigeration device secured to a refrigeration trailer such that when activated the fan means may draw cool air from the refrigeration trailer and pass same through the first flexible conduit means, through the generally rigid conduit means, through the second flexible conduit means and into an inside of a tractor; and
   (f) a control means electrically engaged to said fan means and for being electrically engaged to a refrigeration device secured to a refrigeration trailer and for being disposed on an inside of said tractor and for controlling operation of said fan means to maintain a desired atmospheric condition within a tractor.

2. The apparatus of claim 1 (one) wherein said apparatus additionally comprises a first electrical lead in communication with a power supply of a refrigeration device and said control means for supplying electrical power to said control means; a second electrical lead in communication with the power supply of the refrigeration device and said control means for supplying electrical power to said control means; and a third electrical lead in communication with the power supply of the refrigeration device and said fan means for supplying electrical power to said fan means.

3. The apparatus of claim 2 (two) additionally comprising a first clamping means for clamping a first end of said first flexible conduit to said fan housing means.

4. The apparatus of claim 3 (three) additionally comprising a second clamping means for releasably clamping a second end of said first flexible conduit means to a first end of said rigid conduit means.

5. The apparatus of claim 4 (four) additionally comprising a third clamping means for clamping a second end of said rigid conduit means to a first end of said second flexible conduit means.

6. The apparatus of claim 5 (five) wherein said fan means comprises a blade member; said blade member comprises a squirrel-cage type blade.

7. The apparatus of claim 6 (six) wherein said housing means comprises a pair of opposed filter channels for slidably receiving a filter.

8. In combination a vehicle and an improved cooling system; said vehicle having a tractor coupled to a refrigeration trailer; said tractor having an interior portion and a firewall thereof; said trailer having an interior portion thereof and a refrigeration device secured to a front wall thereof for cooling air in said interior portion thereof; the improvement comprising:
   (a) a fan housing member secured to said refrigeration trailer and for containing a fan member;
   (b) a first flexible conduit member coupled to the fan housing member for conducting cool air from the fan housing member;
   (c) a generally rigid conduit member supported by said tractor and coupled to the first flexible conduit member for conducting cool air from the first flexible conduit member;
   (d) a second flexible conduit member coupled to the generally rigid conduit member and communicating with said interior portion of said tractor for conducting cool air from the generally rigid conduit member into said interior portion of said tractor;
   (e) a fan member disposed in said fan housing means and electrically communicating with said refrigeration device secured to said refrigeration trailer such that when activated the fan member draws cool air from said refrigeration trailer and passes same through said first flexible conduit member, through the generally rigid conduit member, through the second flexible conduit member and into said interior portion of said tractor;
   (f) a control means electrically engaged to said fan member and electrically engaged to said refrigeration device secured to said refrigeration trailer and disposed on said interior portion of said tractor for controlling operation of said fan member to maintain a desired atmospheric condition within said tractor.
   (g) a first clamping member for clamping a first end of said first flexible conduit member to said fan housing member;
   (h) a second clamping member for releasably clamping a second end of said first flexible conduit means to a first end of said generally rigid conduit member; and
   (i) a third clamping member for clamping a first end of said second flexible conduit member to a second end of said generally rigid conduit member.

9. The cooling system of claim 8 (eight) wherein said fan member comprises a blade member; said blade member having a structure comprising a squirrel-cage type blade.

10. The cooling system of claim 9 (nine) additionally comprising a first electrical lead in communication with a power supply of a refrigeration device and said control means for supplying electrical power to said control means; a second electrical lead in communication with the power supply of the refrigeration device and said control means for supplying electrical power to said control means; and a third electrical lead in communication with the power supply of the refrigeration device and said fan means for supplying electrical power to said fan member.

11. A process for retrofitting a tractor having a firewall and a refrigeration trailer coupled to said tractor wherein the trailer comprises a refrigeration device for cooling air contained in the trailer comprising the steps of:
   (a) providing a refrigeration trailer having a refrigeration device wherein said trailer comprises an aperture disposed in a front wall of said trailer wherethrough cooled air may be passed;
   (b) providing a cooling system comprising a fan housing member, a fan member, a first flexible conduit member, a generally rigid conduit member, a second flexible conduit member, a filter member, a first electrical line, a second electrical line, a third electrical line, a fourth electrical line, and a control means;
   (c) disposing said fan in said fan housing member;
   (d) securing said fan housing member on said front wall of said trailer such that said fan housing member in generally superimposed on said aperture;
   (e) disposing said filter member in said fan housing member such that air leaving the trailer passes therethrough;
   (f) disposing a firewall aperture in said firewall of said tractor;
   (g) securing a first end of said first flexible conduit member to said fan housing member;
   (h) securing a first end said generally rigid conduit member to a second end of said first flexible conduit member;
   (i) securing a first end of said second flexible conduit member to a second end of said generally rigid conduit;
   (j) passing a second end of said second flexible conduit member through said firewall aperture;
   (k) disposing said control means in an interior of said tractor;
   (l) connecting a first electrical line between said refrigeration unit secured to said trailer and said control means;
   (m) connecting a second electrical line between said refrigeration unit secured to said trailer and said control means;
   (n) connecting a third electrical line between said refrigeration unit secured to said trailer and said fan member; and
   (o) connecting a fourth electrical line between said control means and said fan member to retrofit said cooling system to said tractor and said trailer.

12. A process for cooling a tractor coupled to a refrigeration trailer having a refrigeration device for cooling air contained in the refrigeration trailer comprising the steps of:
   (b) providing a cooling system comprising a fan housing member, a fan member, a first flexible conduit member, a generally rigid conduit member, a second flexible conduit member, a filter member, a first electrical line, a second electrical line, a third electrical line, a fourth electrical line, and a control means;
   (c) disposing said fan in said fan housing member;
   (d) securing said fan housing member on said front wall of said trailer such that said fan housing member in generally superimposed on said aperture;

(e) disposing said filter member in said fan housing member such that air leaving the trailer passes therethrough;

(f) disposing a firewall aperture in said firewall of said tractor;

(g) securing a first end of said first flexible conduit member to said fan housing member;

(h) securing a first end said generally rigid conduit member to a second end of said first flexible conduit member;

(i) securing a first end of said second flexible conduit member to a second end of said generally rigid conduit;

(j) passing a second end of said second flexible conduit member through said firewall aperture;

(k) disposing said control means in an interior of said tractor;

(l) connecting a first electrical line between said refrigeration unit secured to said trailer and said control means;

(m) connecting a second electrical line between said refrigeration unit secured to said trailer and said control means;

(n) connecting a third electrical line between said refrigeration unit secured to said trailer and said fan member; and (o) connecting a fourth electrical line between said control means and said fan member (p) operating said refrigeration device of said refrigeration trailer to cool the air contained therein;

(q) activating said fan member with said control means;

(r) conducting air from said trailer through said filter member into said fan housing member;

(s) conducting air from said fan housing member through said generally flexible air conduit;

(t) conducting air from said generally flexible air conduit into an interior of said tractor for cooling said tractor.

13. A process for cooling an interior of a tractor and a refrigeration trailer in combination wherein said combination comprises a cooling system for cooling the tractor with air conducted from a refrigeration trailer comprising the steps of:

(a) providing said tractor having a firewall and a firewall aperture disposed in said firewall, and a trailer having a refrigeration device and an aperture disposed in a front wall of said trailer;

(b) providing the cooling system having a filter member, a fan housing member, a fan member, a first flexible conduit member, a generally rigid conduit member, a second flexible conduit member, at least four electrical lines, and a control means for regulating said fan member;

(c) pushing cooled air from the refrigeration device;

(d) circulating cooled air from the refrigeration device along a top of said trailer to a rear wall;

(e) circulating cooled air downward along the rear wall;

(f) drawing air along a bottom of the trailer with the refrigeration device; and (g) operating said cooling system to draw a portion of the air though said aperture of said trailer.

14. The process of claim 13 (thirteen) additionally comprising drawing air over perishables contained in the trailer before said operating step (g).

15. The process of claim 14 additionally comprising warning the air before said operating step (g).

16. An apparatus for conducting air from a refrigeration trailer to a tractor that is coupled to the refrigeration trailer comprising a fan housing means for containing a fan member, and secured to a refrigeration trailer for containing cool air;

a flexible conduit means, coupled to the fan housing means, for conducting said cool air from the fan housing means to said tractor; and a fan means, disposed in said fan housing means and electrically communicating with a refrigeration device of said refrigeration trailer, for circulating said cooled air from said refrigeration trailer through said flexible conduit means and into an interior of said tractor.

17. The apparatus of claim 16 additionally comprising a control means, in communication with said fan means and said refrigeration device, for regulating said fan means.

18. A process for cooling an interior of a tractor with cool air from a refrigeration trailer that is coupled to the tractor, comprising the steps of:

(a) providing a tractor having a firewall and a firewall aperture disposed in said firewall, and a trailer having a refrigeration device and an aperture disposed in a front wall of said trailer;

(b) providing a tractor cooling system having a fan housing member in communication with said aperture of said trailer, a fan member disposed in said fan housing member, a flexible conduit member in communication with said fan housing member and said firewall aperture of said front wall of said tractor, a control means for regulating said fan member, and a plurality of electrical lines in communication with said control means, said fan member, and said refrigeration device for supplying electrical power to said fan member;

(c) emitting cool air into said refrigeration trailer with the refrigeration device; and (d) operating said cooling system to draw a portion of the emitted cool air of step (c) through said aperture of said trailer with said fan member, and to convey said portion of cool air through said flexible conduit, and through said firewall aperture of said tractor to cool an interior of same.

19. The process of claim 18 wherein said operating step additionally comprises regulating the fan member with said control means.

20. A process for cooling an interior of a tractor comprising the steps of:

(a) providing a tractor having an interior, an engine, and a firewall disposed between the interior and the engine;

(b) providing a refrigeration trailer having cool air;

(c) extending a conduit from the firewall of the tractor to the refrigeration trailer such that the conduit communicates with the interior of the tractor and with an interior of the refrigeration trailer having said cool air;

(d) withdrawing said cool air from the refrigeration trailer; and (e) passing the withdrawn cool air through the conduit and through the firewall of the tractor to cool the interior thereof.

* * * * *